May 26, 1925.
J. R. BARTHOLOMEW
1,538,917
AUTOMOTIVE BRAKE MECHANISM
Filed April 11, 1922
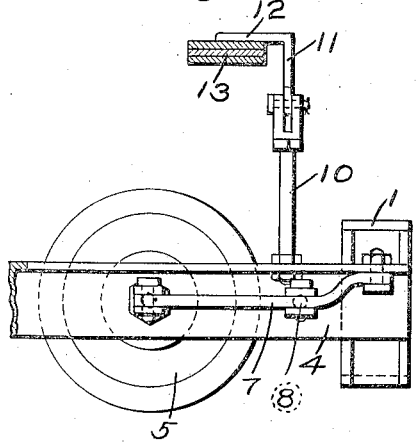
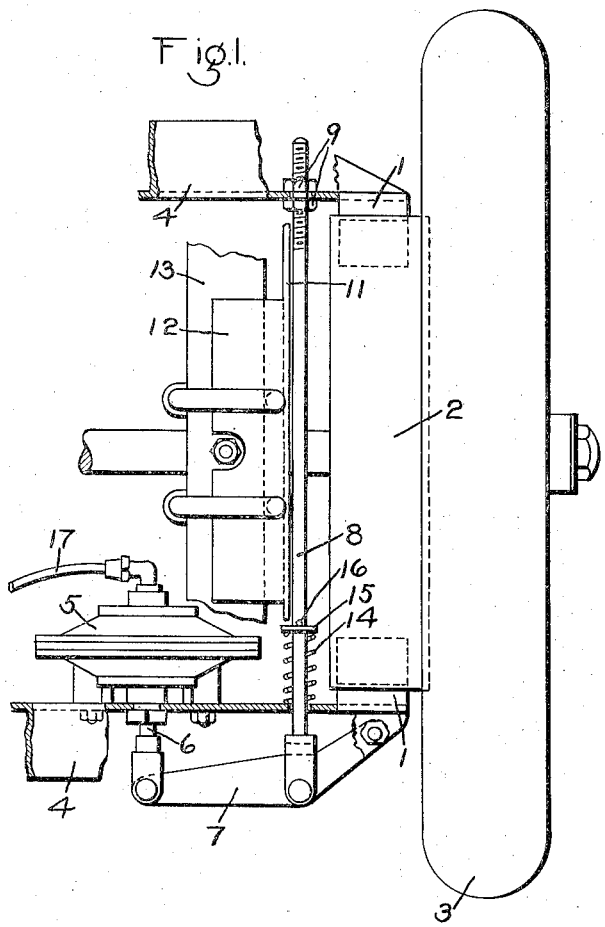
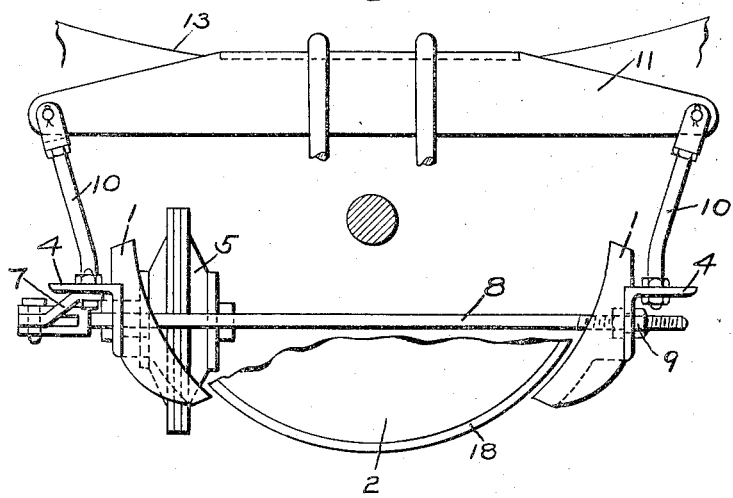
INVENTOR
JOHN R. BARTHOLOMEW
BY *Wm. M. Cady*
ATTORNEY Patented May 26, 1925.

1,538,917

UNITED STATES PATENT OFFICE.

JOHN R. BARTHOLOMEW, OF MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE MECHANISM.

Application filed April 11, 1922. Serial No. 551,712.

*To all whom it may concern:*

Be it known that I, JOHN R. BARTHOLOMEW, a citizen of the United States, residing at Montclair, in the county of Essex and State of New Jersey, have invented new and useful Improvements in Automotive Brake Mechanisms, of which the following is a specification.

This invention relates to fluid pressure brakes, and more particularly to a brake equipment for an automotive vehicle.

One object of my invention is to provide an automotive brake equipment in which metallic brake shoes are employed.

Another object of my invention is to provide an automotive brake rigging in which the fluid pressure brake chamber is carried by the brake rigging.

Other objects and advantages will appear in the following more detailed description of the invention.

In the accompanying drawing; Fig. 1 is a partial plan view of the drive wheel portion of a motor vehicle, showing a brake equipment embodying my improvements applied thereto; Fig. 2 an end elevation of the brake equipment shown in Fig. 1; and Fig. 3 a side elevation of the brake equipment.

According to my invention I employ brake shoes 1, preferably of cast iron and adapted to engage a brake drum 2, in place of the usual band brake construction heretofore employed on automotive vehicles. A brake drum 2 is secured at each rear wheel 3 and brake shoes 1 are carried by brake beams 4, preferably of angle iron, at opposite sides of the brake drums 2 and at opposite ends of each brake beam, so that in applying the brakes, a clasp brake action of the brake shoes is secured.

A fluid pressure brake chamber comprising a casing 5 is secured to the rear brake beam 4, preferably two chambers being employed and so spaced apart, that there is a brake chamber adjacent to each brake shoe at opposite ends of the brake beam 4. The casing 5 contains a flexible diaphragm (not shown) adapted to be operated by fluid under pressure for actuating a diaphragm rod 6 through which the brakes are applied. Such a construction having been heretofore proposed, as disclosed in a pending application of George S. Lane, Serial No. 335,299, filed November 3, 1919.

The diaphragm rod 6 of each brake chamber is pivotally connected to one end of a lever 7, the other end of which is pivotally connected to the brake beam 4 and at an intermediate point, a tie rod 8 is pivotally connected to the lever 7. The tie rod 8 is secured, preferably by slack adjusting nuts 9 to the brake beam 4 at the opposite side of the rear axle. The brake beams 4 and the brake shoes 1 are supported by hanger rods 10, said rods being pivotally mounted on opposite ends of an angle iron section 11, one flange 12 of which rests on top of the usual vehicle springs 13.

A coil spring 14 on each tie rod 8 reacts between the brake beam 4 and a collar 15 held in position on the rod by a pin 16 and operates as a release spring.

In operation, when fluid under pressure is supplied through pipe 17 to each brake chamber 5, the flexible diaphragm therein is operated to project the rod 6 and the lever 7 is thereby operated to exert a pull on the tie rod 8 to draw the opposite brake beam 4 with the attached brake shoes 1 toward the brake drums 2 and at the same time the reactive force of the lever 7 is applied to the adjacent brake beam 4 to press the attached brake shoes against the brake drums 2.

The brake shoes 1 are thus applied to the brake drums at opposite sides thereof to effect a clasp brake action, the brake chamber at each side of the vehicle operating simultaneously to apply the brake shoes to both brake drums, as will be evident. When fluid is released from the brake chambers 5, the release springs 14 operate to shift the brake rigging and the brake shoes to release position. The brake shoes 1 may be adjusted with respect to the brake drums 2 and slack due to wear of the brake shoes may be taken up by adjusting the nuts 9.

If desired, a single centrally arranged brake chamber may be employed instead of two brake chambers, in which case, the opposite brake levers 7 are both connected to the single diaphragm rod of the brake chamber.

A wearing bushing 18 may be applied to the brake drum 2, so that when a certain amount of wear has developed, the bushing may be renewed, without having to replace the entire brake drum. The pipe 17 which conveys fluid under pressure to the brake chamber, is made of flexible material, such as a copper pipe, so as to allow for movement of the brake chamber with the brake rigging in applying and releasing the brake.

Having now described my invention, what I claim as new and desire to secure by Letters Patent, is:—

1. In an automotive brake, the combination with a brake rigging including opposite brake beams, of a fluid pressure brake chamber carried by one brake beam and having a brake operating rod extending through an opening in the supporting brake beam, a tie rod connected to the other brake beam and extending through an opening in the brake chamber supporting brake beam, and a lever connected to said brake beam and to the tie rod and the operating rod.

2. In an automotive brake, the combination with a brake drum, brake shoes adapted to engage the opposite sides of said brake drum, and a brake beam for supporting each brake shoe, of a brake chamber mounted on the inner face of one brake beam and having an operating rod extending through an opening in said brake beam, a tie rod connected to the other brake beam and extending through an opening in the brake beam carrying the brake chamber, and a lever positioned at the outer face of the last mentioned brake beam and connected thereto and having connection with said operating rod and said tie rod.

In testimony whereof I have hereunto set my hand.

JOHN R. BARTHOLOMEW.